ABSTRACT OF THE DISCLOSURE

A nitrogen compound derived from boric acid and hydrazine.

---

The compound of the invention may be designated by the empirical formula $N_2H_4 \cdot 2HBO_2$ and has a non-cyclic structure which may be designated as $$HBO_2 \cdot H_2N\text{---}NH_2 \cdot HBO_2$$

The compound shows herbicidal activity and is particularly active as a defoliant.

The compound of the invention is made by reacting boric acid and hydrazine at room temperature in an organic solvent having solubility for both of the reactants. The ratio of reactants that will be used will be, preferably, essentially equimolar. Solutions of boric acid and hydrazine each in dimethylformamide, dimethylacetamide or like solvent may simply be mixed, and the product will precipitate from the liquid reaction mass at room temperature. The solid product is removed by filtration, washed wth one or more solvents and dried under vacuum. The yields of the product obtained are exceptionally high being on the order of 96 to 100%.

The following examples will illustrate the procedure by which the compound is made and how it is used. (All parts are by weight.)

EXAMPLE I

A mixture of 32 parts of hydrazine (1.0 mole) and 50 parts of dimethylformamide is added dropwise to a solution of 62 parts of boric acid (1.0 mole) in 240 parts of dimethylformamide, the addition being made at 30° C. Precipitation of a colorless solid occurs as the hydrazine solution is added. The solid is filtered off, washed with dimethylformamide and benzene and dried under high vacuum (0.1 mm. Hg) to yield 57 parts of product (96% of theory). The product sinters at about 100° C. and undergoes decomposition at about 124° C. to 160° C. during which decomposition it foams. Analysis for the product is as follows:

Calculated for: $N_2H_4 \cdot 2HBO_2$, H, 5.05%; N, 23.41%; B, 18.08%. Found: H, 5.50%; N, 23.29%; B, 18.11%.

A neutral equivalent determination also confirmed the composition and an infrared spectrum indicated the absence of any cyclic structure.

EXAMPLE II

The compound as prepared in Example I was tested for herbicidal activity on Black Valentine bean plants and produced 100% abscission after 14 days when sprayed on the plants at a concentration of 10 lbs. per acre. Desiccation of the same bean plants was 5% after 7 days at 1 lb. per acre and 50% after 7 days at 10 lbs. per acre. Thus the compound has appreciable herbicidal activity.

It will be understood that numerous changes and variations may be made from the above description and examples illustrating the invention without departing from the spirit and scope thereof.

I claim:
1. A compound of the formula $N_2H_4 \cdot 2HBO_2$.
2. The process of reacting essentially equimolar amounts of hydrazine and boric acid in a mutual solvent system and separating off a solid product of the empirical formula $N_2H_4 \cdot 2HBO_2$.

References Cited

UNITED STATES PATENTS 3,119,652    1/1964    Uchida et al. _____ 23—358

OSCAR R. VERTIZ, *Primary Examiner.*

H. S. MILLER, *Assistant Examiner.*